(12) United States Patent
Mihara (10) Patent No.: US 11,898,990 B2
(45) Date of Patent: Feb. 13, 2024

(54) BONDING INTERFACE EVALUATION METHOD AND BONDING INTERFACE EVALUATION DEVICE

(71) Applicant: SHIMANE UNIVERSITY, Matsue (JP)

(72) Inventor: Tsuyoshi Mihara, Sendai (JP)

(73) Assignee: SHIMANE UNIVERSITY, Shimane (JP)

(*) Notice: Subject to any disclaimer, the term of this patent is extended or adjusted under 35 U.S.C. 154(b) by 479 days.

(21) Appl. No.: 17/270,381

(22) PCT Filed: Jul. 29, 2019

(86) PCT No.: PCT/JP2019/029575
§ 371 (c)(1),
(2) Date: Feb. 22, 2021

(87) PCT Pub. No.: WO2020/039850
PCT Pub. Date: Feb. 27, 2020

(65) Prior Publication Data
US 2021/0181153 A1    Jun. 17, 2021

(30) Foreign Application Priority Data

Aug. 22, 2018  (JP) ................. 2018-155605

(51) Int. Cl.
  *G01N 29/04* (2006.01)
  *G01N 29/44* (2006.01)
(52) U.S. Cl.
  CPC ......... *G01N 29/04* (2013.01); *G01N 29/4409* (2013.01); *G01N 2291/267* (2013.01)
(58) Field of Classification Search
  None
  See application file for complete search history.

(56) References Cited

U.S. PATENT DOCUMENTS

| 5,078,013 A | * | 1/1992 | Kuramochi | G01H 1/04 73/620 |
| 2006/0260403 A1 | | 11/2006 | Waschkies | |

FOREIGN PATENT DOCUMENTS

| JP | S60-228959 A | 11/1985 |
| JP | H05-048860 B2 | 7/1993 |

(Continued)

OTHER PUBLICATIONS

Mihara, Tsuyoshi et al., "Development of High Functional Ultrasonic Imaging System for Bonding Interfaces Using Nonlinear Ultrasound", Tetsu-to-Hagané, vol. 98, No. 11, (2012), pp. 575-582.

(Continued)

*Primary Examiner* — Raul J Rios Russo
*Assistant Examiner* — Carl F. R. Tchatchouang
(74) *Attorney, Agent, or Firm* — Oliff PLC (57) ABSTRACT

An ultrasonic transverse wave is transmitted or ultrasonic longitudinal wave and transverse wave are transmitted in a perpendicular direction to a bonding interface between materials by transmission such as a probe. A reflection signal of the transmitted transverse wave reflected by the bonding interface and/or a transmission signal of the transmitted transverse wave transmitted through the bonding interface and the longitudinal wave, a reflection signal of the transmitted longitudinal wave reflected by the bonding interface and/or a transmission signal of the transmitted longitudinal wave transmitted through the bonding interface are received by reception such as the probe. A physical quantity of the reflection signal or the transmission signal of the transverse wave, out of the received signals, and the longitudinal wave, a joined state of the bonding interface is evaluated by analysis evaluation, utilizing a predetermined physical quantity of the reflection signal or the transmission signal of the longitudinal wave.

10 Claims, 3 Drawing Sheets

(56) References Cited

FOREIGN PATENT DOCUMENTS

| JP | H05-288722 A | 11/1993 |
|---|---|---|
| JP | H08-211028 A | 8/1996 |
| JP | 2000-146928 A | 5/2000 |
| JP | 2001-305109 A | 10/2001 |
| JP | 2006-084305 A | 3/2006 |
| JP | 2013-036743 A | 2/2013 |

OTHER PUBLICATIONS

Tsuboi, Motohiro et al., "High Sensitive Evaluation of Delaminations Using Ultrasonic Imaging", The Japan Society of Mechanical Engineers, (2009), pp. 1-2.
Oct. 21, 2019 Search Report issued in International Patent Application No. PCT/JP2019/029575.
Aug. 3, 2020 International Preliminary Report om Patentability issued in International Patent Application No. PCT/JP2019/029575.
Oct. 13, 2021 Extended Search Report issued in European Patent Application No. 19851786.4.
Brotherhood, C.J. et al., "The Detectability of Kissing Bonds in Adhesive Joints using Ultrasonic Techniques", Ultrasonics, IPC Science and Technology Press LTD., Guildford, GB, vol. 41, No. 7, (2003), pp. 521-529.
Hirsekorn, S., "Quality Assessment of Bond Interfaces by Nonlinear Ultrasonic Transmission", AIP Conference Proceedings, vol. 509, (2000), pp. 1367-1374.

* cited by examiner

BONDING INTERFACE EVALUATION METHOD AND BONDING INTERFACE EVALUATION DEVICE

FIELD OF THE INVENTION

The present invention relates to a bonding interface evaluation method and a bonding interface evaluation device.

DESCRIPTION OF RELATED ART

Conventionally, a vertical flaw detection for quantitatively evaluating whether or not a bonding interface is good by causing longitudinal ultrasound to be perpendicularly incident on the bonding interface, receiving a reflected wave of the incident ultrasound from the bonding interface and a transmitted wave thereof through the bonding interface, and utilizing the received reflected wave and transmitted wave has been widely conducted as a typical method for evaluating a joined state of a bonding interface formed by joining materials by bonding, welding or the like (see, for example, patent literature 1 or 2).

However, in such a conventional vertical flaw detection utilizing a longitudinal wave, there has been a problem that a joined part so-called a kissing bond where materials are in contact, but not joined and a coronabond around a nugget at the time of spot welding are misidentified as a joined sound part since no reflection echo occurs on an interface. Accordingly, a method utilizing burst ultrasound as an incident wave has been and is being developed to solve this problem (see, for example, patent literature 3 or 4).

It should be noted that a water immersion imaging method using ultrasound has been developed as a method for detecting microdefects and the like by the present inventor and other researchers (see, for example, non-patent literature 1).

CITATION LIST

Patent Literature

Patent Literature 1: JP-A-S60-228959
Patent Literature 2: JP-A-H05-288722
Patent Literature 3: JP-A-2001-305109
Patent Literature 4: JP-A-2006-84305

Non-Patent Literature

Non-Patent Literature 1: "Development of high functional ultrasonic imaging system for bonding interfaces using nonlinear ultrasound" by Tsuyoshi Mihara, Yuki Takayanagi, Yutaka Suziki, Takashi Saito and Hatsuzo Tashiro, *Tetsu-to-Hagane*, Vol. 98, No. 11, pp. 575-582

SUMMARY OF THE INVENTION

However, with the method utilizing the burst longitudinal ultrasound as described in patent literature 3 and 4, kissing bonds and coronabonds whose joined state can be precisely evaluated have been very limited.

The present invention has been made focusing on such a problem. It is an object of the present invention to provide a bonding interface method and a bonding interface device capable of precisely evaluating a joined state of an unjoined part such as a kissing bond or a coronabond.

Focusing on that a longitudinal wave used in a conventional ultrasonic measurement is a compressional wave and propagates while pressing an interface, whereas a transverse wave is a shear wave and excellent in detecting a discontinuous part and frequently used as a standard method in ultrasonic flaw detection, the present inventor had an eye on a measurement using a transverse wave. Conventionally, a method for causing a transverse wave to be perpendicularly incident via a contact medium having a high viscosity by a special transverse wave piezoelectric element or a method for causing a transverse wave to be incident by causing a longitudinal wave to be obliquely incident using a wedge has been employed as an incident method of transverse ultrasound into a solid. However, a method for easily causing a transverse wave to be perpendicularly incident on a bonding interface without using a special element or a contact medium does not exist, and measurements have been difficult. Accordingly, the present inventor focused on that arched longitudinal wave and transverse wave are simultaneously generated like seismic waves when ultrasound propagating into a solid is incident on a micro-region, and reached the present invention.

Specifically, a bonding interface evaluation method according to the present invention is a bonding interface evaluation method for evaluating a joined state of a bonding interface between materials and includes a transmission step of transmitting an ultrasonic transverse wave in a substantially perpendicular direction to the bonding interface, a reception step of receiving a reflection signal of the transverse wave transmitted in the transmission step and reflected by the bonding interface and/or a transmission signal of the transverse wave transmitted in the transmission step and transmitted through the bonding interface, and an evaluation step of evaluating the joined state of the bonding interface on the basis of a predetermined physical quantity of the reflection signal and/or the transmission signal of the transverse wave received in the reception step.

A bonding interface evaluation device according to the present invention is a bonding interface evaluation device for evaluating a joined state of a bonding interface between materials and includes transmission means provided to be able to transmit an ultrasonic transverse wave in a substantially perpendicular direction to the bonding interface, reception means provided to be able to receive a reflection signal of the transverse wave transmitted from the transmission means and reflected by the bonding interface and/or a transmission signal of the transverse wave transmitted from the transmission means and transmitted through the bonding interface, and analysis evaluation means configured to evaluate the joined state of the bonding interface on the basis of a predetermined physical quantity of the reflection signal and/or the transmission signal of the transverse wave received by the reception means.

In the bonding interface evaluation method according to the present invention, preferably, an ultrasonic longitudinal wave and the transverse wave are simultaneously transmitted in the transmission step, a reflection signal of the longitudinal wave transmitted in the transmission step and reflected by the bonding interface and/or a transmission signal of the longitudinal wave transmitted in the transmission step and transmitted through the bonding interface are also received in the reception step, and the joined state of the bonding interface is evaluated, utilizing at least the physical quantity of the reflection signal or the transmission signal of the longitudinal wave and the physical quantity of the reflection signal or the transmission signal of the transverse wave, out of the signals received in the reception step, in the evaluation step. Further, in the bonding interface evaluation device according to the present invention, preferably, the transmission means is provided to be able to simultaneously transmit an ultrasonic longitudinal wave and the transverse wave, the reception means is provided to be able to receive also a reflection signal of the longitudinal wave transmitted from the transmission means and reflected by the bonding interface and/or a transmission signal of the longitudinal wave transmitted from the transmission means and transmitted through the bonding interface, and the analysis evaluation means is configured to evaluate the joined state of the bonding interface, utilizing at least the physical quantity of the reflection signal or the transmission signal of the longitudinal wave and the physical quantity of the reflection signal or the transmission signal of the transverse wave, out of the signals received by the reception means.

The bonding interface evaluation method according to the present invention is suitably carried out by the bonding interface evaluation device according to the present invention. The bonding interface evaluation method and the bonding interface evaluation device according to the present invention can evaluate the joined state of the bonding interface as follows by transmitting the ultrasonic transverse wave or the ultrasonic longitudinal wave and the transverse wave in the substantially perpendicular direction to the bonding interface. If an interface between materials is joined as in a nugget at the time of spot welding, both the longitudinal wave and the transverse wave are hardly reflected by that interface and physical quantities such as amplitudes of the transmission signals increase. Further, if an interface is open and completely unjoined, the physical quantities of the reflection signals increase since both the longitudinal wave and the transverse wave are reflected by that interface. Further, since the longitudinal wave, which is a compressional wave, easily transmits through an interface where materials are in contact, but not joined as in a kissing bond or a coronabond, but the transverse wave, which is a shear wave, is easily reflected by that interface, the physical quantities of the transmission signal of the longitudinal wave and the reflection signal of the transverse wave tend to increase. Thus, in the case of utilizing only the transverse wave, it is possible to evaluate a joined state, i.e. whether or not the materials are in contact, the interface is open or the interface is joined although the materials are in contact, by the comparison of the physical quantity or quantities of the reflection signal and/or the transmission signal of the transverse wave. Further, in the case of utilizing also the longitudinal wave, an even more detailed joined state can be evaluated by utilizing at least the physical quantity of the reflection signal or the transmission signal of the longitudinal wave and the physical quantity of the reflection signal or the transmission signal of the transverse wave. As just described, the bonding interface evaluation method and the bonding interface evaluation device according to the present invention can precisely evaluate even a joined state of an unjoined part such as a kissing bond or a coronabond.

In the bonding interface evaluation method and the bonding interface evaluation device according to the present invention, the ultrasound may be transmitted using any method and means if only the transverse wave can be generated or the longitudinal wave and the transverse wave can be simultaneously generated. For example, a point sound source, a line sound source, a small-area sound source having a diameter of 3 to 10 mm or less, an elongated linear sound source having a width of 3 to 10 mm or less, a probe having one of these or the like may be used. Further, the reflection signals and the transmission signals may be received by any method and means if only the transverse wave can be received or the longitudinal wave and the transverse wave can be received. For example, a probe or the like may be used. Further, the physical quantity used for evaluation is preferably a waveform, an amplitude or a spectrum of the reflection signal or the transmission signal. Further, in the evaluation of the joined state of the bonding interface, it is preferred to evaluate a bonding area, an interface opening or a bonding strength of the bonding interface.

In the bonding interface evaluation method according to the present invention, at least the transmission signals of the longitudinal wave and the transverse wave may be received in the reception step, and the joined state of the bonding interface may be evaluated on the basis of a difference or a ratio of the physical quantity of the transmission signal of the longitudinal wave and the physical quantity of the transmission signal of the transverse wave received in the reception step in the evaluation step. In the bonding interface evaluation device according to the present invention, the reception means may be configured to receive at least the transmission signals of the longitudinal wave and the transverse wave, and the analysis evaluation means may be configured to evaluate the joined state of the bonding interface on the basis of a difference or a ratio of the physical quantity of the transmission signal of the longitudinal wave and the physical quantity of the transmission signal of the transverse wave received by the reception means. Further, the bonding interface evaluation method and the bonding interface evaluation device according to the present invention may utilize a combination of the transmission signal of the longitudinal wave and the reflection signal of the transverse wave, a combination of the reflection signal of the longitudinal wave and the transmission signal of the transverse wave or a combination of the reflection signal of the longitudinal wave and the reflection signal of the transverse wave besides a combination of the transmission signal of the longitudinal wave and the transmission signal of the transverse wave. Further, the transmission signal and the reflection signal of the longitudinal wave and the transmission signal and the reflection signal of the transverse wave may also be utilized. In any of these cases, the joined state of the bonding interface can be precisely evaluated.

In the bonding interface evaluation method according to the present invention, the longitudinal wave and the transverse wave may be transmitted from a probe in the transmission step, and the reflection signals and/or the transmission signals may be received by the probe in the reception step. The bonding interface evaluation device according to the present invention may include a probe provided to be able to transmit and receive ultrasound, the transmission means may be configured to transmit the longitudinal wave and the transverse wave from the probe, and the reception means may be configured to receive the reflection signals and/or the transmission signals by the probe. In this case, the longitudinal wave and the transverse wave can be transmitted and the reflection signals and the transmission signals can be received, using one probe. It should be noted that the probe preferably has a diameter of 10 mm or less.

Further, in the bonding interface evaluation method according to the present invention, the longitudinal wave and the transverse wave may be transmitted from each of a plurality of probes in the transmission step, and the reflection signals and/or the transmission signals of each probe may be received by each probe in the reception step. The bonding interface evaluation device according to the present invention may include a plurality of probes provided to be able to transmit and receive ultrasound, the transmission means may be configured to transmit the longitudinal wave and the transverse wave from each probe, and the reception means may be configured to receive the reflection signals and/or the transmission signals of each probe by each probe. In this case, the joined state of the bonding interface can be more accurately evaluated, utilizing a survey method or a flaw detection method using the plurality of probes such as a phased array method. For example, in the case of utilizing the phased array method, a procedure of obtaining acoustic images of not only the longitudinal wave, but also the transverse wave is also added and a joined state can be accurately evaluated by a difference between the behaviors of the both images. It should be noted that each probe preferably has a diameter of 10 mm or less.

The bonding interface evaluation method and the bonding interface evaluation device according to the present invention can evaluate a joined state of any interface if the interface is a bonding interface between materials, and can evaluate, for example, joined states of bonding interfaces between materials joined by bonding, various types of welding such as spot welding and FSW (Friction Stir Welding), pressure bonding, diffusion bonding and the like.

The present invention can provide a bonding interface evaluation method and a bonding interface evaluation device capable of precisely evaluating a joined state of an unjoined part such as a kissing bond or a coronabond.

BRIEF DESCRIPTION OF THE DRAWINGS

FIG. 1 includes sectional views of a bonding interface evaluation device of an embodiment of the present invention showing a used state in (A) a welded part formed with a nugget and (B) a welded part, which is a coronabond, FIG. 2 relates to a bonding interface evaluation method of the embodiment of the present invention and shows a visualized image showing a state of propagation of each wave in a glass plate after 3 seconds following laser irradiation by a photoelastic visualization method when a pulsed laser was irradiated to one point on an end surface of the glass plate, FIG. 3 relates to the bonding interface evaluation method of the embodiment of the invention and includes (A) an image showing the position (position of a transverse line in a figure) of a transmission signal of a longitudinal wave (transmitted longitudinal wave) in a B-scope image of a transmission echo obtained on the underside of a steel plate, (B) an A-scope image at the position of a longitudinal line in the B-scope image, (C) an image showing the position (position of a transverse line in a figure) of a transmission signal of a transverse wave (transmitted transverse wave) in the B-scope image and (D) an A-scope image at the position of the longitudinal line in the B-scope image when the pulsed laser shown in FIG. 1 was irradiated to a surface of the steel plate, FIG. 4 relates to the bonding interface evaluation method of the embodiment of the invention and includes (A) a side view of an experiment of transmitting a longitudinal wave from a surface of a steel plate by a probe, (B) a reflection echo on the underside of the steel plate when a probe having a diameter of 30 mm was used, and (C) a reflection echo on the underside of the steel plate when a probe having a diameter of 6 mm was used, and FIG. 5 relates to the bonding interface evaluation method of the embodiment of the invention and includes acoustic images of a longitudinal wave (L wave images) and acoustic images of a transverse wave (S wave images) of bonding interfaces between materials by a water immersion imaging method for (A) a structure in which a nugget is formed in a spot-welded part between the materials and a coronabond is formed around the nugget and (B) a structure in which no nugget is formed in a spot-welded part and only a coronabond is formed.

DETAILED DESCRIPTION OF THE INVENTION

Hereinafter, an embodiment of the present invention is described on the basis of the drawings.

FIGS. 1 to 5 show a bonding interface evaluation device and a bonding interface evaluation method of the embodiment of the present invention.

Figure 1:
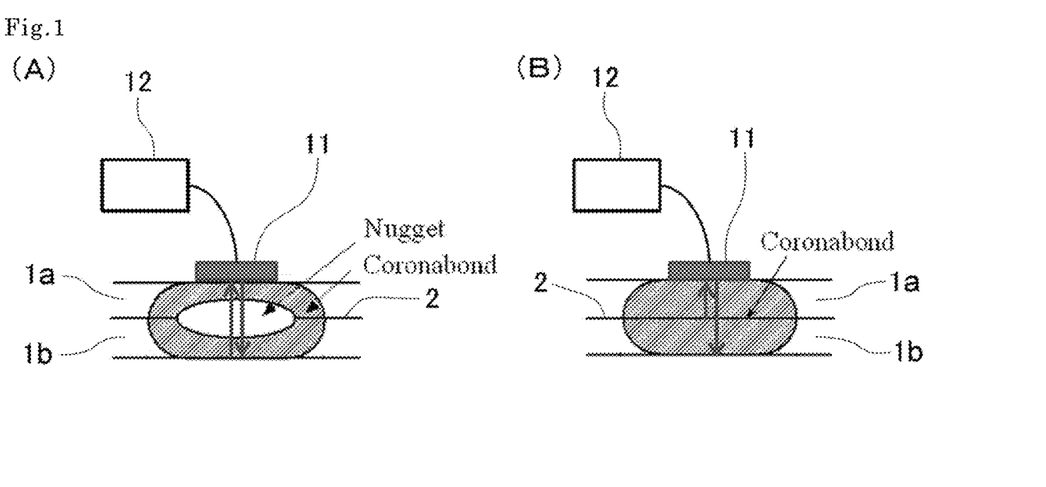

As shown in FIG. 1, the bonding interface evaluation device 10 of the embodiment of the present invention is for evaluating a joined state of a bonding interface 2 between materials 1a and 1b and includes a probe 11 and analysis evaluation means 12.

The probe 11 is provided to be able to transmit and receive ultrasound and constitutes transmission means and reception means. The probe 11 includes a small-area sound source having a diameter of 3 to 10 mm or less and transmits an ultrasonic longitudinal wave from a surface of one material 1a, whereby the longitudinal wave is converted into a transverse wave by the surface of the material 1a and that transverse wave can also propagate in the material 1a. In this way, the probe 11 is configured to be able to simultaneously transmit the ultrasonic longitudinal wave and transverse wave in a substantially perpendicular direction to the bonding interface 2 to be evaluated.

Further, the probe 11 is configured to be able to receive a reflection signal of the transmitted longitudinal wave reflected by the bonding interface 2 and a transmission signal of the transmitted longitudinal wave transmitted through the bonding interface 2 and a reflection signal of the transmitted transverse wave reflected by the bonding interface 2 and a transmission signal of the transmitted transverse wave transmitted through the bonding interface 2. It should be noted that the transmission signals are signals representing the longitudinal wave and the transverse wave transmitted from the surface of the one material 1a, transmitted through the bonding interface 2, reflected by a surface on an opposite side of the other material 1b and transmitted through the bonding interface 2 again. Further, the transmission means may be the one capable of transmitting only the transverse wave, other than the probe 11. Further, the reception means may be the one capable of receiving only the transverse wave, other than the probe 11.

The analysis evaluation means 12 is constituted by a computer and configured to evaluate the joined state of the bonding interface 2, utilizing the signals received by the probe 11. Specifically, the analysis evaluation means 12 is configured to evaluate the joined state of the bonding interface 2 by an amplitude intensity of the transmission signal of the transverse wave and that of the reflection signal of the transverse wave, out of the received signals. Alternatively, the analysis evaluation means 12 is configured to utilize at least one pair of amplitude intensities, out of the amplitude intensity of the transmission signal of the transverse wave and that of the reflection signal of the transverse wave, an amplitude intensity of the transmission signal of the longitudinal wave and that of the transmission signal of the transverse wave, the amplitude intensity of the transmission signal of the longitudinal wave and that of the reflection signal of the transverse wave, an amplitude intensity of the reflection signal of the longitudinal wave and that of the transmission signal of the transverse wave, and the amplitude intensity of the reflection signal of the longitudinal wave and that of the reflection signal of the transverse wave among the received signals, obtain a difference or a ratio of those two amplitude intensities and evaluate the joined state of the bonding interface 2 by the magnitude of that difference or ratio. It should be noted that, without limitation to amplitude intensities, waveforms and spectra may be utilized for evaluation.

The bonding interface evaluation method of the embodiment of the present invention is more suitably carried out by the bonding interface evaluation device 10. In the bonding interface evaluation method of the embodiment of the present invention, the probe 11 is disposed on the surface of the one material 1a for the bonding interface 2 between the materials 1a and 1b to be evaluated as shown in FIG. 1. Ultrasonic longitudinal wave and transverse wave are simultaneously transmitted in a substantially perpendicular direction to the bonding interface 2 from the disposed probe 11. After the transmission, a reflection signal of the transmitted longitudinal wave reflected by the bonding interface 2 and a transmission signal of the transmitted longitudinal wave transmitted through the bonding interface 2 and a reflection signal of the transmitted transverse wave reflected by the bonding interface 2 and a transmission signal of the transmitted transverse wave transmitted through the bonding interface 2 are received by the probe 11.

The amplitude intensity of the transmission signal of the transverse wave and that of the reflection signal of the transverse wave, out of the signals received by the probe 11, are obtained by the analysis evaluation means 12. Alternatively, at least one pair of the amplitude intensity of the transmission signal of the transverse wave and that of the reflection signal of the transverse wave, the amplitude intensity of the transmission signal of the longitudinal wave and that of the transmission signal of the transverse wave, the amplitude intensity of the transmission signal of the longitudinal wave and that of the reflection signal of the transverse wave, the amplitude intensity of the reflection signal of the longitudinal wave and that of the transmission signal of the transverse wave and the amplitude intensity of the reflection signal of the longitudinal wave and that of the reflection signal of the transverse wave out of the signals received by the probe 11, are utilized and a difference or a ratio of those two amplitude intensities is obtained by the analysis evaluation means 12.

At this time, if the bonding interface between the materials 1a and 1b is joined in the nugget at the time of welding shown in FIG. 1(A), the longitudinal wave and the transverse wave are hardly reflected by that interface and the amplitude intensities of the transmission signals increase. Further, if the interface is open and completely unjoined, the longitudinal wave and the transverse wave are reflected by that interface, wherefore the amplitude intensities of the reflection signals increase. Further, since the longitudinal wave, which is a compressional wave, easily transmits through the interface where the materials 1a, 1b are in contact, but not joined as in a kissing bond or a coronabond shown in FIG. 1(B), but the transverse wave, which is a shear wave, is easily reflected by that interface, the amplitude intensities of the transmission signal of the longitudinal wave and the reflection signal of the transverse wave tend to increase. Thus, a detailed joined state, such as whether or not the materials 1a, 1b are in contact, the interface is open, or the interface is joined although the materials 1a, 1b are in contact, can be evaluated using the amplitude intensities of the transmission signal and the reflection signal of the transverse wave or the magnitude of the difference or ratio of the two amplitude intensities obtained by the analysis evaluation means 12. Further, if measurement data under specific bonding conditions is collected, the evaluation of bonding strength can be expected.

As just described, the bonding interface evaluation method and the bonding interface evaluation device 10 of the embodiment of the present invention can precisely evaluate even a joined state of an unjoined part such as the kissing bond or coronabond shown in FIG. 1(B). Further, the joined state can be evaluated by transmitting the longitudinal wave and the transverse wave and receiving the reflection signals and the transmission signals by one probe 11.

[Confirmation of Transverse Wave Generation and Echo Measurement]

Figure 2:
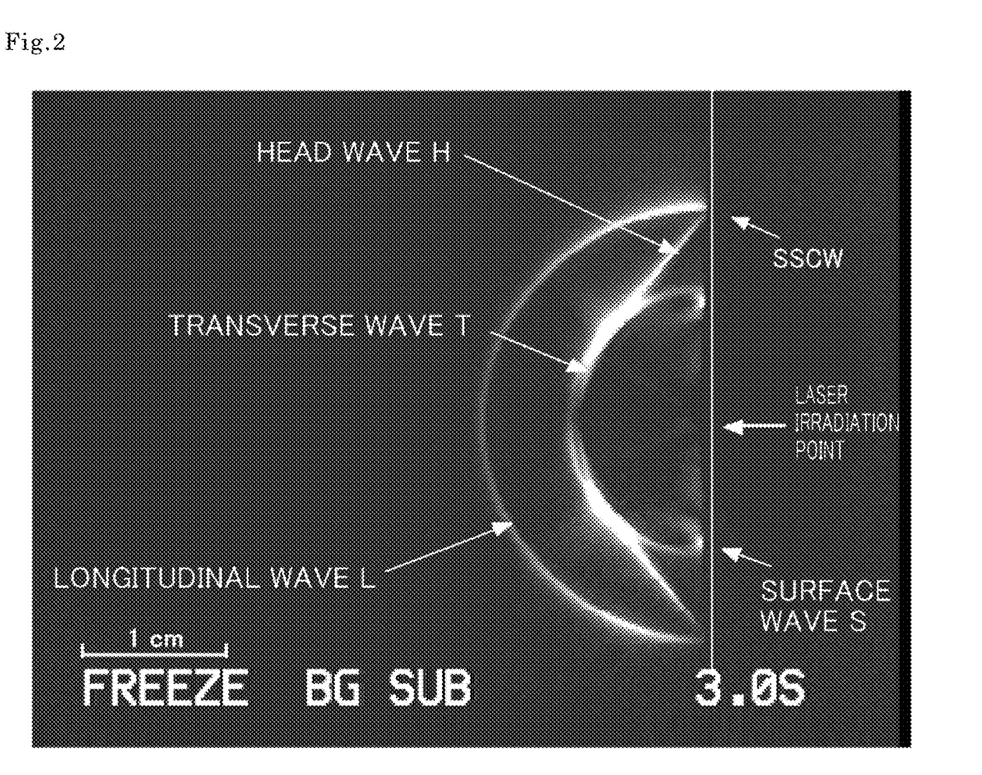

An experiment was conducted to confirm that the smaller an incident area of the transmission means such as the probe 11, the relatively higher the incidence efficiency of a transverse wave. First, an experiment of generating a longitudinal wave and a transverse wave by a pulsed laser was conducted. In the experiment, using a glass plate having a sound velocity of 5500 m/s and a thickness of 20 mm, the pulsed laser was irradiated to one point on an end surface of the glass plate to cause a thermal expansion and generate a longitudinal wave. A state of propagation of generated waves in the glass plate was observed by a photoelastic visualization method. The state of propagation after 3 seconds following laser irradiation is shown in FIG. 2. As shown in FIG. 2, the wavefronts of not only the longitudinal wave, but also a transverse wave, a head wave and surface waves (SSCW, etc.) are confirmed. From this, it can be said that the incidence efficiency of the transverse wave becomes relatively high and the longitudinal wave and the transverse wave are easily incident from a specimen surface if an incident area is small such in the case of a point sound source or a line sound source, wherefore a joined state can be evaluated by measuring reflection signals and transmission signals.

Figure 3:
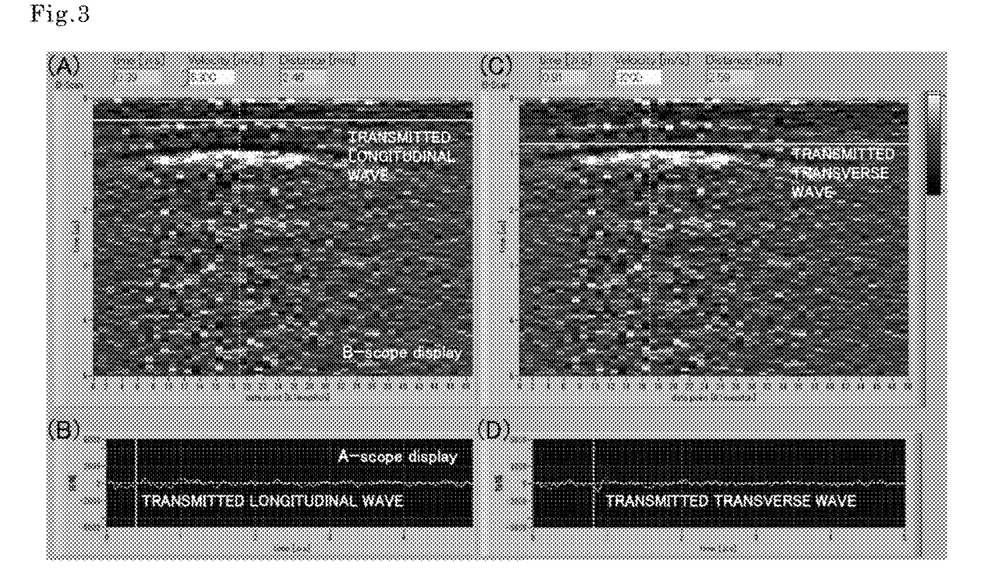

An experiment was conducted in which this pulsed laser was irradiated to a steel plate to generate a longitudinal wave and a transverse wave and transmission signals of the longitudinal wave and the transverse wave were measured on the underside of the steel plate. In the experiment, the pulsed laser was irradiated to one surface of the steel plate, and a laser interferometer was scanned on the other surface side of the steel plate to obtain a B-scope image of a transmission echo. An image showing the position (position of a transverse line in a figure) of the transmission signal of the longitudinal wave (transmitted longitudinal wave) in the obtained B-scope image is shown in FIG. 3(A), and an A-scope display at the position of a longitudinal line in the B-scope image is shown in FIG. 3(B). Further, an image showing the position (position of a transverse line in a figure) of the transmission signal of the transverse wave (transmitted transverse wave) in the obtained B-scope image is shown in FIG. 3(C), and an A-scope display at the position of a longitudinal line in the B-scope image is shown in FIG. 3(D). As shown in FIG. 3, the transmission signals of the longitudinal wave and the transverse wave were clearly confirmed.

Figure 4:
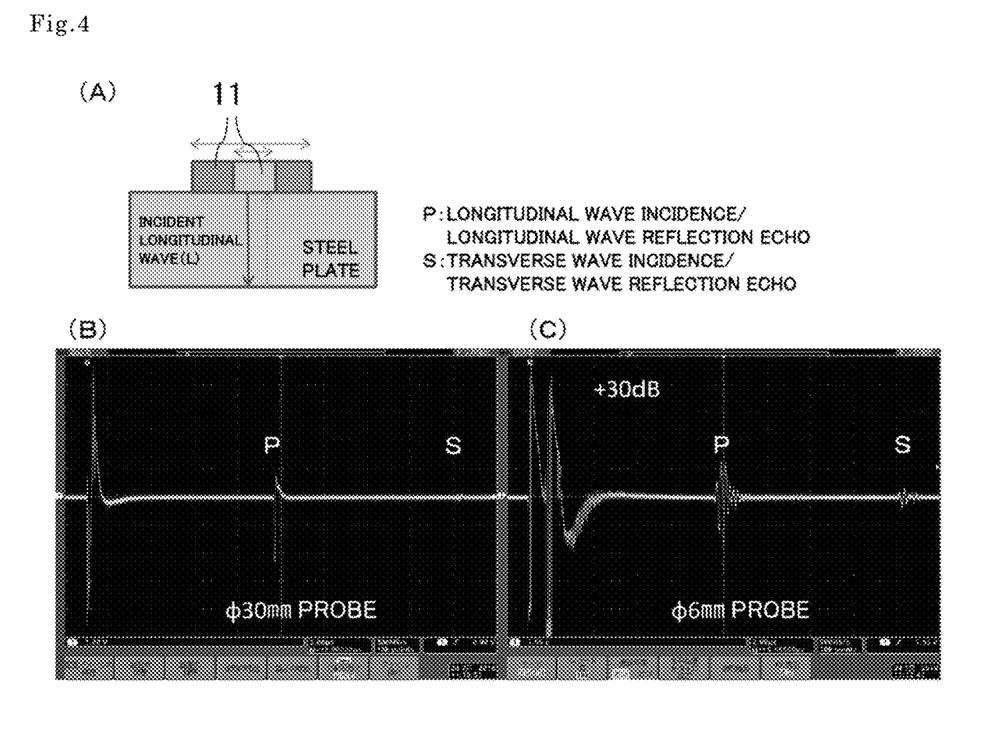

Next, an experiment was conducted in which a longitudinal wave and a transverse wave were generated using probes 11 including a piezoelectric element. As shown in FIG. 4(A), in the experiment, the longitudinal wave was transmitted with the probe 11 placed on a steel plate and a reflection echo on the underside of the steel plate was measured, using two types of probes 11 having diameters of 30 mm and 6 mm. Measurement results by the respective probes 11 having the diameters of 30 mm and 6 mm are respectively shown in FIGS. 4(B) and (C). A waveform of P in FIGS. 4(B) and (C) is a longitudinal wave reflection echo of longitudinal wave incidence, and a waveform of S is a transverse wave reflection echo of transverse wave incidence.

As shown in FIG. 4(B), it was confirmed that the longitudinal wave was strongly incident and an amplitude of the longitudinal wave reflection echo of P increased since the probe 11 having a larger diameter basically had higher directivity and a longitudinal wave plane wave was incident. Further, it was confirmed that an amplitude of the transverse wave reflection echo of S decreased since an amplitude of the transverse wave generated by mode conversion at the time of incidence was small. In contrast, as shown in FIG. 4(C), it was confirmed that an energy of the transmitted ultrasound decreased (an amplitude of P is equal to that in FIG. 4(B) at −30 dB) since the probe 11 having a smaller diameter had a smaller element area, but the transverse wave was also strongly generated and an amplitude of the transverse wave reflection echo of S became relatively large since the tendency of a point sound source was generated at the time of incidence.

From the result of the experiment shown in FIG. 4, it is found that the amplitude of the transverse wave reflection echo becomes relatively large on the basis of the longitudinal wave reflection echo although the transmitted ultrasound energy decreases by reducing the size of the piezoelectric element of the probe 11. From this, it can be said that, if the element size of the probe 11 is maximally reduced, the incidence efficiency of the transverse wave becomes relatively high, which is advantageous for measurement using the transverse wave.

The bonding interface evaluation method and the bonding interface evaluation device 10 of the embodiment of the present invention can evaluate a joined state of any interface if the interface is a bonding interface between materials, and can be applied to the evaluation of not only the bonding interface 2 of spot welding as shown in FIG. 1, but also, for example, bonding interfaces difficult to evaluate by an acoustic measurement using only a longitudinal wave, out of bonding interfaces between materials joined by bonding, various types of welding such as FSW (Friction Stir Welding), pressure bonding, diffusion bonding and the like.

It should be noted that the bonding interface evaluation method and the bonding interface evaluation device 10 of the embodiment of the present invention may include a plurality of probes 11, transmit a longitudinal wave and a transverse wave from each probe 11 and receive reflection signals and transmission signals of the longitudinal wave and the transverse wave transmitted from each probe 11 by each probe 11. In this case, the joined state of the bonding interface 2 can be more accurately evaluated, utilizing a survey method or a flaw detection method using the plurality of probes 11 such as a phased array method. For example, in the case of utilizing the phased array method, a joined state can be accurately evaluated by measuring and using also an acoustic image of a transverse wave in addition to an existing measurement using longitudinal wave ultrasound.

[Study on Effects in the Case of Utilizing Transverse Wave]

Figure 5:
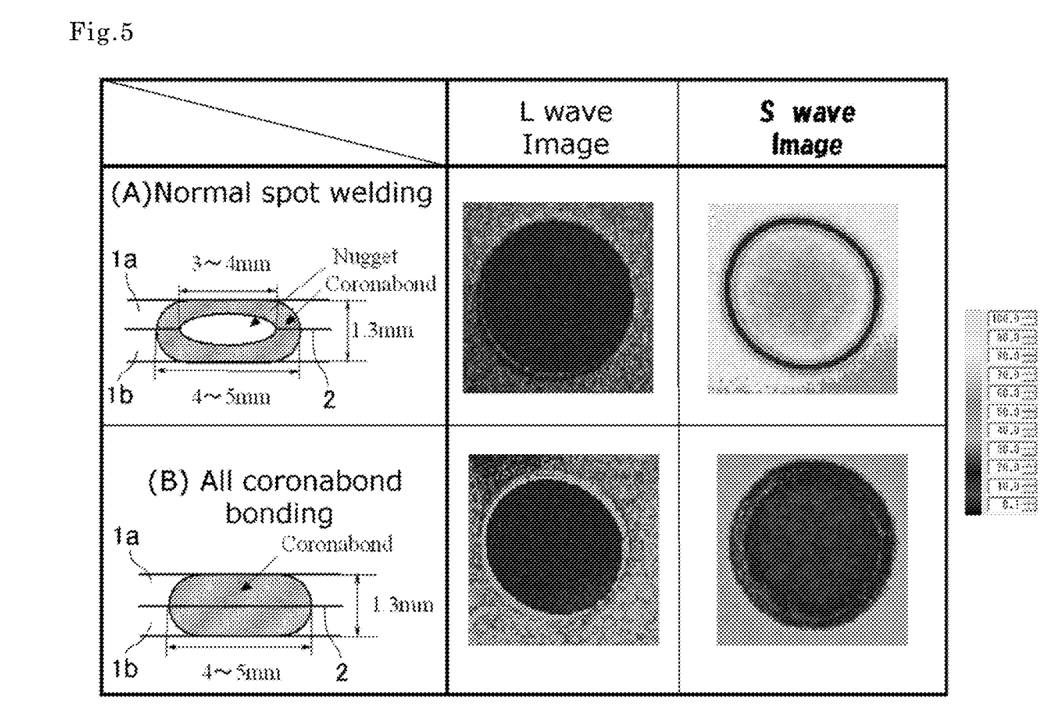

To study effects in the case of utilizing a longitudinal wave and a transverse wave, a transmission signal of the longitudinal wave and a transmission signal of the transverse wave were measured for the bonding interface 2 formed by spot-welding the materials 1a, 1b. The measurement was conducted for simulated materials having a structure in which a nugget was formed in a spot-welded part and a coronabond was formed around the nugget as shown in FIG. 5(A) and a structure in which no nugget is formed in a spot-welded part and a bonding interface is entirely a coronabond as shown in FIG. 5(B). A water immersion imaging method utilizing ultrasound shown in non-patent literature 1 was used for the measurement.

In the measurement, the longitudinal wave is transmitted in a perpendicular direction from a surface (upper surface in FIGS. 5(A) and (B)) of one material 1a by a standard acoustic lens for water immersion measurement. It should be noted that this acoustic lens also generates a transverse wave by converting the longitudinal wave on the surface of the one material 1a, but the transverse wave can be ignored here since the intensity thereof is small. Here, for a longitudinal wave (L wave) measurement, a longitudinal wave reflected wave amplitude on the bonding interface 2 was extracted at an electric gate and imaged in accordance with an existing standard bonding interface evaluation procedure. That image (L wave image) is shown in FIGS. 5(A) and (B). In the longitudinal wave measurement, since no reflection echo is observed on the bonding interface 2 in both FIGS. 5(A) and (B) as conventionally reported, a nugget part and a coronabond part in a center are black and difficult to discriminate although the bonding strength largely differs.

Subsequently, in a measurement from a specimen surface, the longitudinal wave was converged on the underside and an amplitude of a transmitted transverse wave was imaged when a mode converted transverse wave generated on the underside was incident on the bonding interface 2 from the underside since there was no means for causing a transverse wave to be perpendicularly incident on the bonding interface 2 by a water immersion measurement method. That image (S wave image) is shown in FIGS. 5(A) and (B). In a transverse wave measurement, it was confirmed that an acoustic image was white and the transverse wave was transmitted with a sufficient intensity in the normally joined nugget part as shown in FIG. 5(A), whereas an acoustic image was black in a central part and the transverse wave was not transmitted in the coronabond part having no bonding strength although being held in close contact as shown in FIG. 5(B). As just described, the structures of FIGS. 5(A) and (B) are difficult to discriminate in the existing longitudinal wave acoustic image (L wave image), whereas these structures can be evaluated with sound bonding and unsound bonding distinguished if the transverse wave acoustic image (S wave image) is utilized.

As described above, the measurement of the transverse wave, which is a shear wave, is higher in interface measurement sensitivity than the measurement of the longitudinal wave, which is a compressional wave, and can evaluate a bonding failure of an interface undetectable by the existing longitudinal wave measurement, but there has been conventionally no simple measurement method capable of causing a transverse wave to be perpendicularly incident from a specimen surface. The bonding interface evaluation method and the bonding interface evaluation device according to the present invention propose a bonding interface acoustic measurement/evaluation method having a high versatility by including direct contact of a probe and using a mode converted transverse wave generated when longitudinal wave ultrasound is incident in a small area singly or together with the longitudinal wave for measurement.

REFERENCE SIGNS LIST

1a, 1b material
2 bonding interface 10 bonding interface evaluation device
11 probe
12 analysis evaluation means

What is claimed is:

1. A bonding interface evaluation method for evaluating a joined state of a bonding interface between materials, comprising:
a transmission step of simultaneously transmitting an ultrasonic longitudinal wave and a transverse wave in a substantially perpendicular direction to the bonding interface;
a reception step of receiving a reflection signal of the ultrasonic longitudinal wave transmitted in the transmission step and reflected by the bonding interface and/or a transmission signal of the ultrasonic longitudinal wave transmitted in the transmission step and transmitted through the bonding interface, and a reflection signal of the transverse wave transmitted in the transmission step and reflected by the bonding interface and/or a transmission signal of the transverse wave transmitted in the transmission step and transmitted through the bonding interface; and
an evaluation step of evaluating a bonding area, an interface opening or a bonding strength of the bonding interface as the joined state of the bonding interface based on a difference between a predetermined physical quantity of the transmission signal of the ultrasonic longitudinal wave and a predetermined physical quantity of the reflection signal of the transverse wave, a difference between a predetermined physical quantity of the reflection signal of the ultrasonic longitudinal wave and a predetermined physical quantity of the transmission signal of the transverse wave, or a difference between a predetermined physical quantity of the reflection signal of the ultrasonic longitudinal wave and a predetermined physical quantity of the reflection signal of the transverse wave, out of signals received in the reception step,
the predetermined physical quantity being a waveform, an amplitude or a spectrum of the reflection signal or the transmission signal.

2. The bonding interface evaluation method according to claim 1, further comprising:
transmitting the ultrasonic longitudinal wave and the transverse wave from a probe in the transmission step; and
receiving reflection signals and/or transmission signals by the probe in the reception step.

3. The bonding interface evaluation method according to claim 2, wherein the probe has a diameter of 10 mm or less.

4. The bonding interface evaluation method according to claim 1, further comprising:
transmitting the ultrasonic longitudinal wave and the transverse wave from each of a plurality of probes in the transmission step; and
receiving reflection signals and/or transmission signals of each probe by each probe in the reception step.

5. The bonding interface evaluation method according to claim 4, wherein the probe has a diameter of 10 mm or less.

6. A bonding interface evaluation device for evaluating a joined state of a bonding interface between materials, comprising:
a probe configured to:
simultaneously transmit ultrasonic longitudinal wave and transverse wave in a substantially perpendicular direction to the bonding interface; and
receive a reflection signal of the ultrasonic longitudinal wave transmitted from the probe and reflected by the bonding interface and/or a transmission signal of the ultrasonic longitudinal wave transmitted from the probe and transmitted through the bonding interface and a reflection signal of the transverse wave transmitted from the probe and reflected by the bonding interface and/or a transmission signal of the transverse wave transmitted from the probe and transmitted through the bonding interface; and
a processor configured to:
evaluate a bonding area, an interface opening or a bonding strength of the bonding interface as the joined state of the bonding interface based on a difference between a predetermined physical quantity of the transmission signal of the ultrasonic longitudinal wave and a predetermined physical quantity of the reflection signal of the transverse wave, a difference between a predetermined physical quantity of the reflection signal of the ultrasonic longitudinal wave and a predetermined physical quantity of the transmission signal of the transverse wave, or a difference between a predetermined physical quantity of the reflection signal of the ultrasonic longitudinal wave and a predetermined physical quantity of the reflection signal of the transverse wave, out of signals received by the probe,
the predetermined physical quantity being a waveform, an amplitude or a spectrum of the reflection signal or the transmission signal.

7. The bonding interface evaluation device according to claim 6, wherein:
the probe consists of one probe configured to:
transmit the ultrasonic longitudinal wave and the transverse wave; and
receive reflection signals and/or transmission signals.

8. The bonding interface evaluation device according to claim 7, wherein the probe has a diameter of 10 mm or less.

9. The bonding interface evaluation device according to claim 6, wherein:
the probe comprises a plurality of probes configured to:
transmit the ultrasonic longitudinal wave and the transverse wave from each probe of the plurality probes; and
receive reflection signals and/or transmission signals of each probe by each probe.

10. The bonding interface evaluation device according to claim 9, wherein the probe has a diameter of 10 mm or less.

* * * * *